United States Patent
Jones et al.

(10) Patent No.: US 7,540,430 B2
(45) Date of Patent: Jun. 2, 2009

(54) SYSTEM AND METHOD FOR STRING DISTANCE MEASUREMENT FOR ALPHANUMERIC INDICIA

(75) Inventors: David H. Jones, Bellevue, WA (US); Mihael Ankerst, Munich (DE)

(73) Assignee: The Boeing Company, Chicago, IL (US)

( * ) Notice: Subject to any disclaimer, the term of this patent is extended or adjusted under 35 U.S.C. 154(b) by 667 days.

(21) Appl. No.: 11/236,265

(22) Filed: Sep. 27, 2005

(65) Prior Publication Data

US 2007/0069023 A1   Mar. 29, 2007

(51) Int. Cl.
  *G06K 19/05*   (2006.01)
(52) U.S. Cl. ........................ 235/494; 235/380
(58) Field of Classification Search ............... 235/380, 235/494, 462.01, 462.04
  See application file for complete search history.

(56) References Cited

U.S. PATENT DOCUMENTS 5,337,361 A * 8/1994 Wang et al. .............. 380/51
5,594,228 A * 1/1997 Swartz et al. ............. 235/383
6,098,892 A * 8/2000 Peoples, Jr. ............... 235/494
7,055,746 B2 * 6/2006 MacKay et al. ........ 235/462.04

OTHER PUBLICATIONS

William W. Cohen et al., A Comparison of String Metrics for Matching Names and Records, 2003, Publisher: American Association for Artificial Intelligence (www.aaai.org), Published in: Internet.
Mikhail Bilendo et al., Adaptive Name Matching in Information Integration, Sep. 2003, Publisher: IEEE Computer Society.
Sam Chapman, String Similarity Metrics for Information Integration,, Published in: Internet.

* cited by examiner

*Primary Examiner*—Daniel St. Cyr
(74) *Attorney, Agent, or Firm*—Klein, O'Neill & Singh, LLP

(57) ABSTRACT

A method and system for determining the relationship between at least two indicia values that can be related to the same article is provided. The system includes a processor for providing a first indicia value, providing a second indicia value, manipulating the first indicia value and the second indicia value based on first rule to obtain a first score; manipulating the first indicia value and the second indicia value based on a second rule to obtain a second score; and concluding that the first indicia value and the second value are related to a same article.

19 Claims, 7 Drawing Sheets

SYSTEM AND METHOD FOR STRING DISTANCE MEASUREMENT FOR ALPHANUMERIC INDICIA

FIELD OF INVENTION

The present invention relates generally to computing systems, and more particularly to an automated process and system that compares at least two indicia values each associated with an article to determine if the two indicia values are for the same article.

BACKGROUND OF THE INVENTION

Information related to any business is recorded in different ways based on the nature of the business and the media it is recorded on. The recorded information is accessed using some form of index or indicia. The term "indicia' as used throughout herein means an identifier for an object, article, component, assembly structures and others. One example, of such indicia (or identifier) in a manufacturing environment is a part number that is used to identify different components/assemblies.

When electronic information is recorded various errors or variations may occur due to various reasons. For example, there could be manual keying errors or errors due to difficulty reading hand-written notes. When trying to identify words read from forms that have been filled out by hand, problems beyond the normal spelling errors occur, and the error rate is much greater than machine printed characters. When attempting to form optical character recognition (OCR) of even reasonably clearly printed machine character strings, an OCR system will create insertion, deletion, substitution and segmentation errors. These normal OCR errors are compounded by normal handwriting errors. These errors include poorly formed letters, non-standard orientations, poor spacing between letters, and the normal variety in the types of pens and pencils used to write with.

Variations in recording information in a business can vary due to different individuals and organizations within the business following different conventions in recording the information. Individuals and organizations have different conventions for entering indicia information in design, production, inventory, ordering, maintenance, etc. These variations/errors make it difficult to correlate information, and perform various aggregation, summarization, and integration operations. Reconciling various indicia can become cumbersome and sometimes result in duplication of records for the same indicia.

In manufacturing and retail environment, part numbers are predominantly used to identify different components/assemblies. The part numbers are entered in various stages of manufacturing/retail. Errors in part numbers can cause various problems including accounting, part traceability, and warranty issues if there are any failures, and others.

Conventional systems fail to address the foregoing problems efficiently. There is, therefore, a need for a method and system to address the structure of these recorded information (for example, part numbers) to enable accurate record matching and reconciliation.

SUMMARY OF THE INVENTION

A method for determining the relationship between at least two indicia values that can be related to the same article is provided. The method includes, providing a first indicia value, providing a second indicia value, manipulating the first indicia value and the second indicia value based on first rule to obtain a first score; manipulating the first indicia value and the second indicia value based on a second rule to obtain a second score; and the maximum of the two scores indicates the relative likelihood that the two indicia values refer to the same article.

A system for determining a relationship between at least two indicia values that can be associated with at least a same article is provided. The system includes a processor that receives a first indicia value; and a second indicia value; manipulates the first indicia value and the second indicia value based on first rule to obtain a first score; manipulates the first indicia value and the second indicia value based on a second rule to obtain a second score; and the maximum of the two scores indicates the relatively likelihood that the two indicia values refer to the same article.

This brief summary has been provided so that the nature of the invention may be understood quickly. A more complete understanding of the invention can be obtained by reference to the following detailed description of the preferred embodiments thereof, in connection with the attached drawings.

DETAILED DESCRIPTION OF THE PREFERRED EMBODIMENTS

Figure 1:
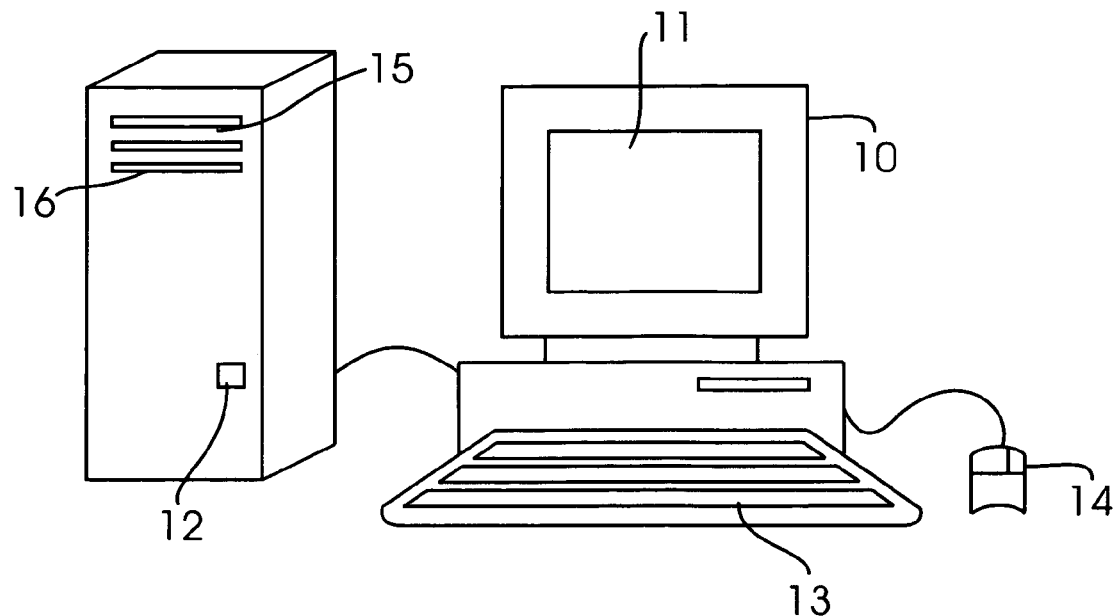
FIG. 1 shows a block diagram of a computing system for executing process steps, according to one aspect of the present invention.

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein, specifically to provide for a method and system for string distance measurement for alphanumeric indicia.

In one aspect of the present invention, a process to automatically reconcile records is provided on a computing system. The computing system could be a stand-alone system or a client-server computing system that is accessible within a company's intranet or through the Internet. The computing system also hosts or has access to the database with information on records that need to be reconciled.

In one aspect of the present invention, the system and method produces a numerical estimate of difference/similarity that is specially adapted to certain information on various records. The system and method addresses transcription errors due to similarity between certain numeric and alphabetic characters, treatment of sub-fields in indicia, different usage of leading pad characters (blank, 0) in indicia fields, and version/release numbers often found at the end of indicia.

In one aspect, indicia values for the same or different articles are analyzed. A pair of rules are used to obtain difference/similarity score values. The maximum of the score values are used to indicate the likelihood that the two indicia values refer to the same article.

In the first set of rules, a first and second indicia value is parsed and a selective group of characters are extracted into a respective first temporary indicia value (first temp-indicia) and a second temp-indicia value. The characters in the first and second temp-indicia are compared character by character and when differences are found the characters from the first or the second temp-indicia are substituted from a pre-configured table to obtain either the modified first temp-indicia or the modified second temp-indicia. Using the first temp-indicia and second modified temp-indicia or the modified first temp-indicia and second temp-indicia, a set of first score input values are calculated. The first score input values are used to arrive at a first score.

Using the second set of rules, the first and second indicia values are divided into one or more first and second sub-indicia fields. The first and second sub-indicia fields are then parsed and selective characters from each of the first and second sub-indicia are extracted into modified first and second sub-indicia. The modified first and second sub-indicia values are then combined to generate first and second temp-indicia values. The first and second temp-indicia are compared character by character and when differences are found, the characters from the first temp-indicia or the second temp-indicia are substituted to generate the modified first or second temp-indicia respectively. Using the modified first temp-indicia and second temp-indicia or the first temp-indicia and modified second temp-indicia a set of second score input values are calculated. The second score input values are used to determine the second score value. The maximum of the score values are used to indicate the likelihood that the two indicia values refer to the same article.

To facilitate an understanding of the preferred embodiments of the invention, the general architecture and operation of a computing system will be described. The specific architecture and operation of the preferred embodiments will then be described with reference to the general architecture.

Computing System:

FIG. 1 is a block diagram of a computing system for executing computer executable process steps according to one aspect of the present invention. FIG. 1 includes a host computer 10 and a monitor 11. Monitor 11 may be a CRT type, a LCD type, or any other type of color or monochrome display.

Also provided with computer 10 are a keyboard 13 for entering data and user commands, and a pointing device (for example, a mouse) 14 for processing objects displayed on monitor 11.

Computer 10 includes a computer-readable memory storage device 15 for storing readable data. Besides other programs, storage device 15 can store application programs including web browsers by which computer 10 connect to the Internet, the intranet or any other network, and computer-executable code according to the present invention.

According to one aspect of the present invention, computer 10 can also access computer-readable floppy disks (or any other removable media) storing data files, application program files, and computer executable process steps embodying the present invention or the like via a floppy disk drive 16. A CD-ROM, or CD R/W (read/write) interface (not shown) may also be provided with computer 10 to access application program files, and data files stored on a CD-ROM.

A modem, an integrated services digital network (ISDN) connection, or the like also provide computer 10 with an Internet connection 12 to the World Wide Web (WWW) or to the intranet—the network of computers within a company or entity within the company or any other network. The Internet (or network) connection 12 allows computer 10 to download data files, application program files and computer-executable process steps embodying the present invention.

It is noteworthy that the present invention is not limited to the FIG. 1 architecture. For example, notebook or laptop computers, set-top boxes or any other system capable of running computer-executable process steps, as described below, may be used to implement the various aspects of the present invention.

Figure 2A:
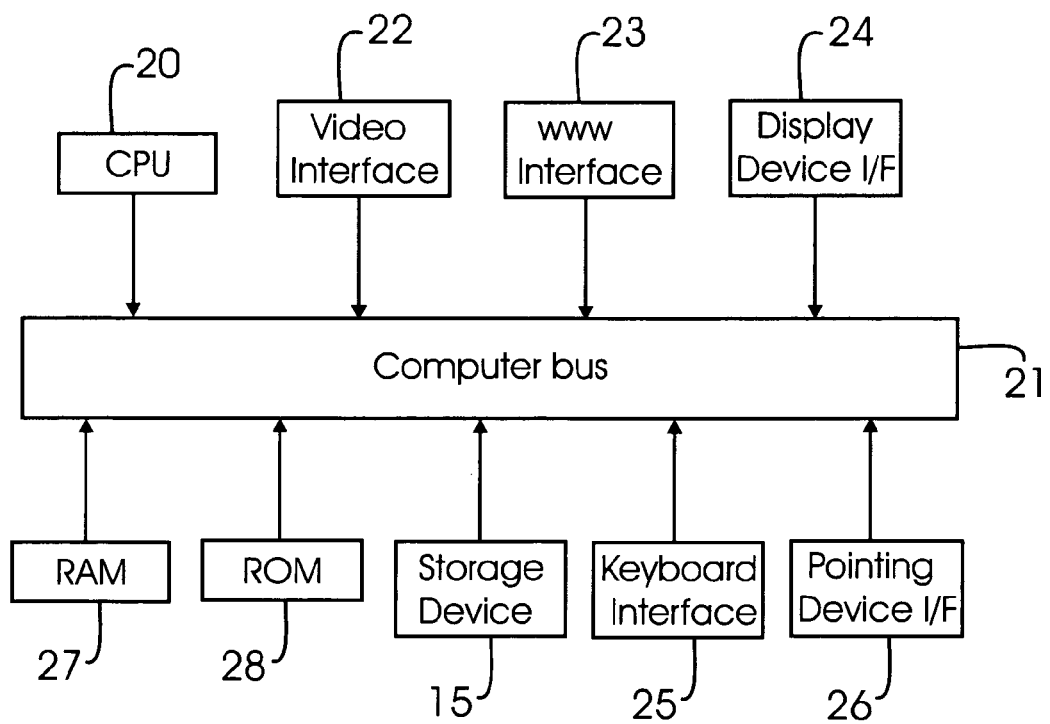
FIG. 2A shows the internal architecture of the computing system in FIG. 1.

FIG. 2A is a block diagram showing the internal functional architecture of computer 10. As shown in FIG. 2A, computer 10 includes a central processing unit ("CPU") 20 for executing computer-executable process steps and interfaces with a computer bus 21. Also shown in FIG. 2A are a video interface 22, a WWW (or network) interface 23, a display device interface 24, a keyboard interface 25, a pointing device interface 26, and storage device 15.

As described above, storage device 15 stores operating system program files, application program files, web browsers, and other files. Some of these files are stored using an installation program. For example, CPU 20 executes computer-executable process steps of an installation program so that CPU 20 can properly execute the application program.

Random access memory ("RAM") 27 also interfaces to computer bus 21 to provide CPU 20 with access to memory storage. When executing stored computer-executable process steps from storage device 15 (or other storage media such as floppy disk 16 or WWW connection 12), CPU 20 stores and executes the process steps out of RAM 27.

Read only memory ("ROM") 28 is provided to store invariant instruction sequences such as start-up instruction sequences or basic input/output operating system (BIOS) sequences for operation of keyboard 13.

Figure 2B:
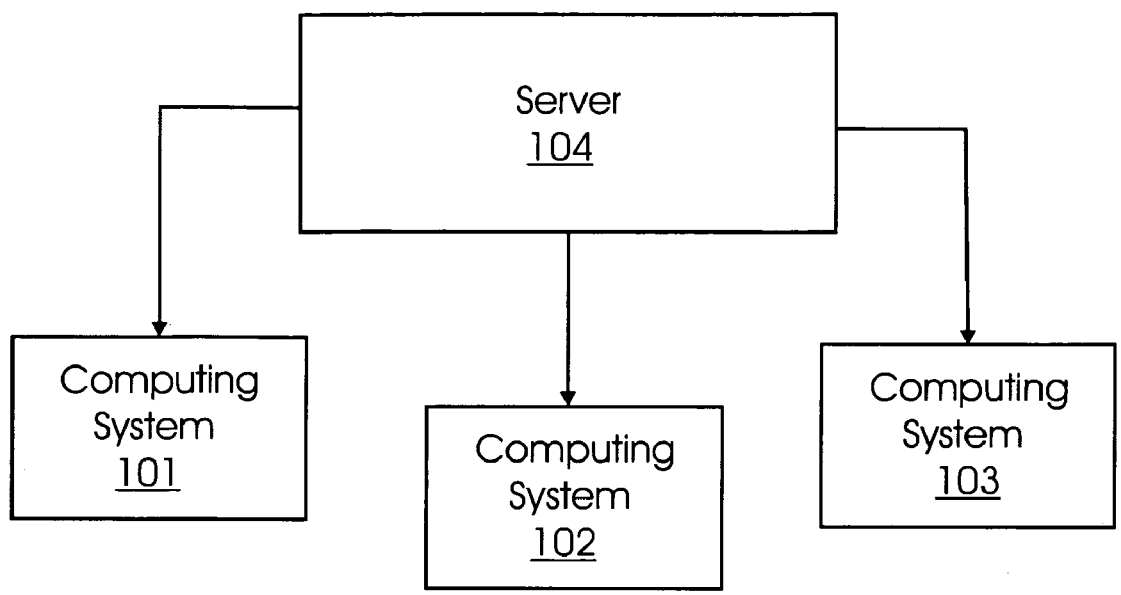
FIGS. 2B and 2C show system level block diagrams, used according to one aspect of the present invention.

System Architecture for the Present Invention:

Those skilled in the art will appreciate that there are adaptations and modifications of the system described herein. FIG. 2B shows a block diagram of a system 100 where a central computing system (or server) 104 receives input from plural computing systems 101, 102 and 103. Different users use computing system 1 and 2 to enter certain indicia values (for example, part numbers). Computing system 103 may be a system used for reconciling the records, according to one aspect of the present invention. The various computing systems of FIG. 2B may have similar configurations described above with respect to FIGS. 1 and 2A. System 100 can be used in a factory, a warehouse or a company within the confines of which the worker is assigned one or more tasks.

A database in server 104 may be used to collect various records comprising of indicia values either entered by users or obtained electronically, for example, by OCR. A user interface permits access to the database. The user interface permits entering and storing data about articles on the database. An example of an user interface, for use in this invention, can be a password protected screen displayed on a monitor (for example, 11) connected to the host computer 10 or one or more computers on the intranet, providing access to the article database on the intranet. The user interface also accepts user input for querying against the database, validates the information entered by the user.

Figure 2C:
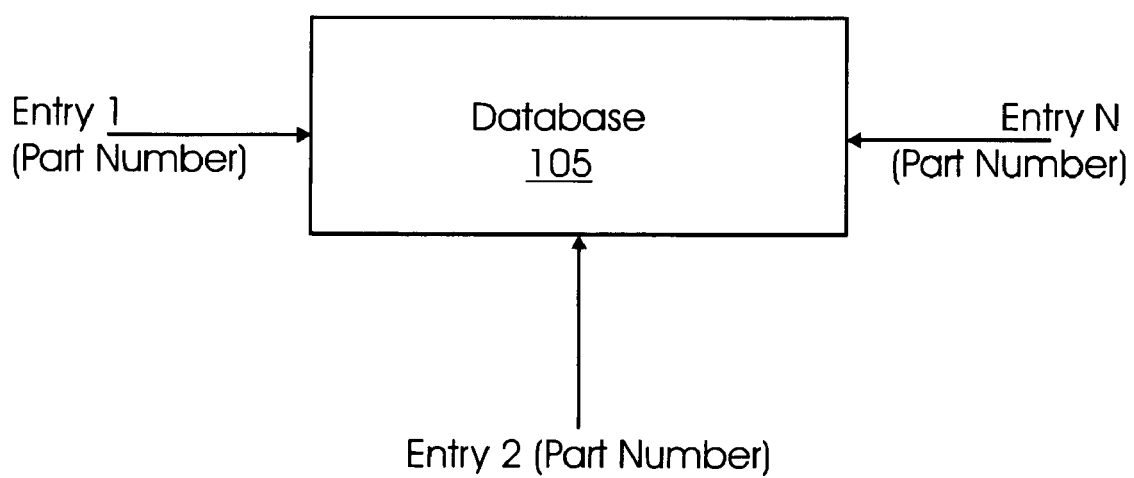

An example of one such database 105 is provided in FIG. 2C. Database 105 is populated by receiving plural entries. FIG. 2C shows entry 1 for part number A, entry 2 also for part number A, except entry 2 is different from entry 1. Also, entry 2 could be for a different number but labeled as being for part number A.

Computer executable code allows manipulation of indicia values (records data), performs character string edits, compare the two indicia values, calculate various score input values and uses the score input values to arrive at first score and second score. The code further determines if the first score and the second score refer to the same article. The results maybe displayed using the output device such as a monitor 11. Computer executable code may be either a) a software application implemented in various programming languages as instructions to be executed by one or more processors on one or more computers under the direction of the software applications or b) application specific integrated circuits (ASICs) implementing the functionality or c) a combination of software application and ASICs implementing the functionality of the algorithm.

Process Flow:

In one aspect, the present invention is a method and system for determining if two records are related, for example, if two-part numbers have been entered during a manufacturing process, then the process can generate a score that indicates the relative likelihood that the two part numbers refer to the same article. To illustrate this embodiment of the invention, a manufacturing company is used where an articles (or component) database (located in a computing system (for example, 104) tracks the status of the various parts along an assembly line. The database is populated with information from various sources within or outside the company.

Figure 2D:
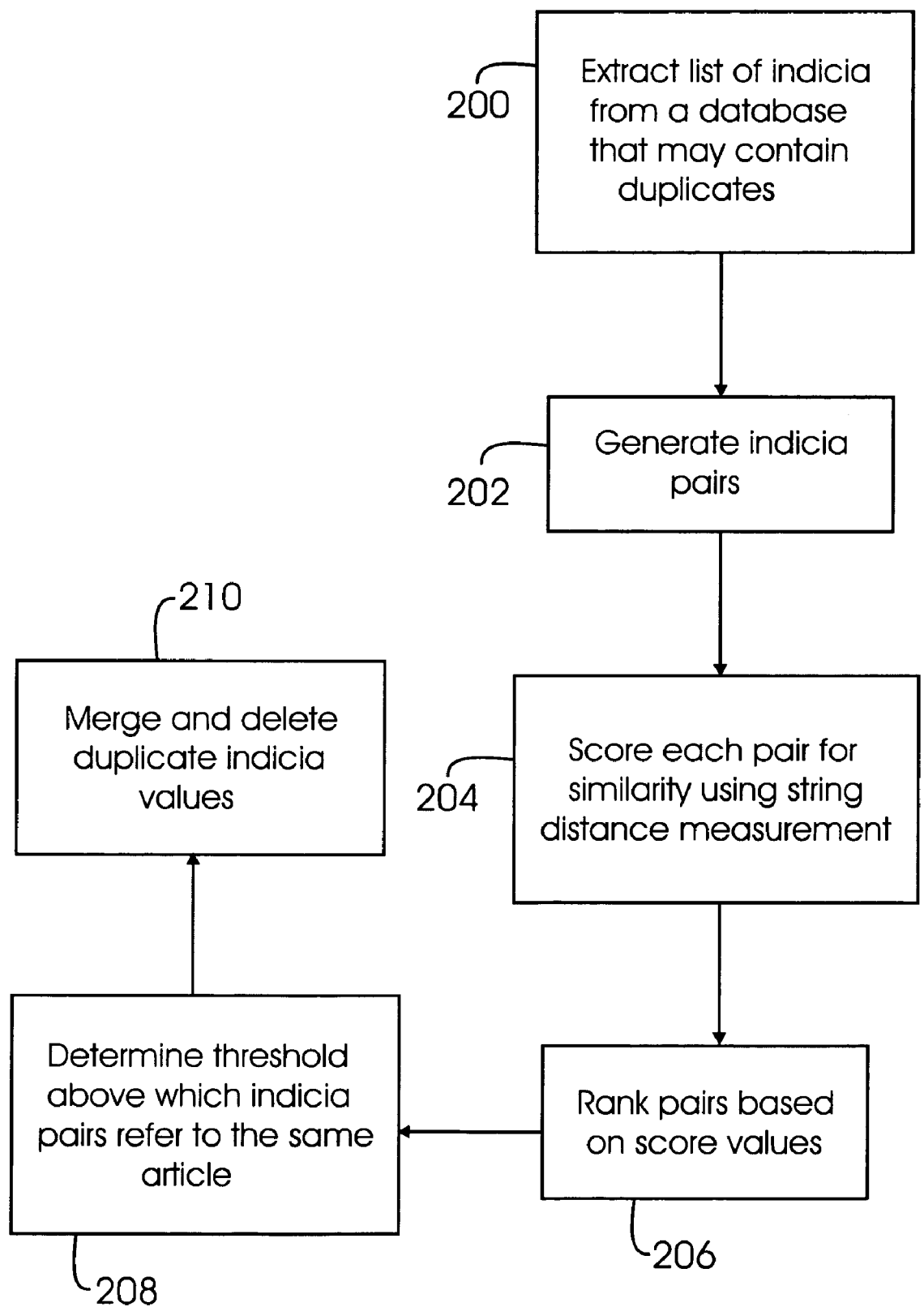
FIG. 2D shows an overall process flow diagram, according to one aspect of the present invention.

FIG. 2D shows a top-level flow diagram for determining if a pair of indicia belongs to the same article. In step 200, a list of indicia is extracted from a database (105). In step 202, indicia pairs are generated. In step 204, each pair is scored for similarity using string distance measurement, as described below with respect to FIG. 3. In step 206, each pair is provided a score value. In step 208, a threshold value is determined above (or below) which the indicia pairs refer to the same article. The process validates if the first and second indicia values are either for the same article or it could also mean that the two articles are from the same genre. If the indicia pair refers to the same article, then in step 210, the indicia pair is merged and the duplicate entry from database 105 is deleted.

Figure 3:
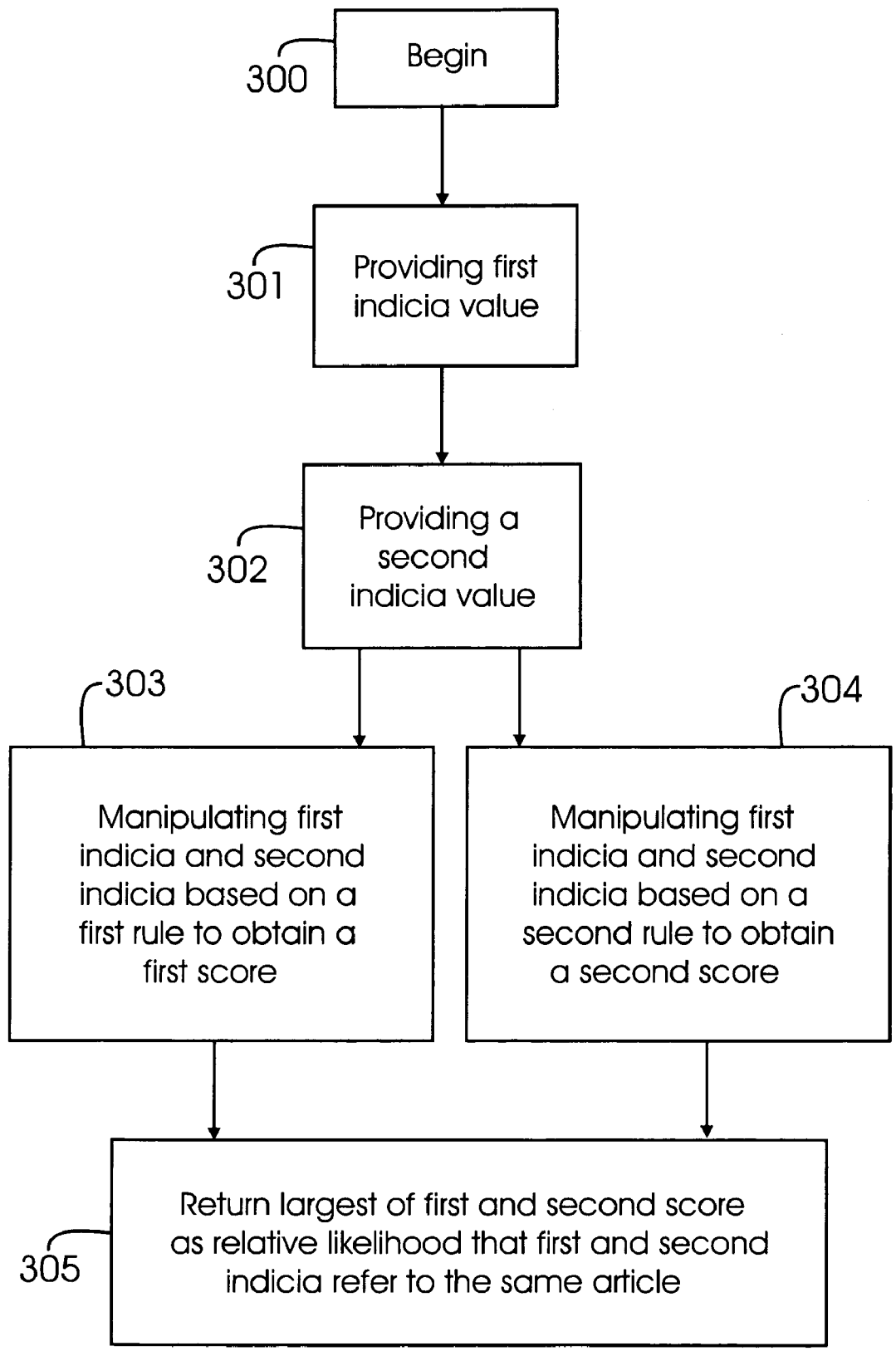
FIG. 3 shows a process flow diagram of the steps involved in executing the algorithm.

FIG. 3 is a flow diagram of computer executable process steps, according to one aspect of the present invention for comparing indicia values to predict if the values are related to the same article (step 204). Turning in detail to FIG. 3 step 301, a first indicia value associated with a first article is provided (similar to step 202). The step of providing a first indicia can be accomplished in one of two ways: a) an articles database is already created and exists on the computing system, the first article record is located, the first indicia related to the first article is identified and then access to the record is provided, or b) the articles database is created on the computing system, populated with information about a plurality of articles within the business, the first article record is located, the first indicia related to the first article is identified and then access is provided. The access to the articles database could be by a user interface—a password protected screen, for example. The databases can be created using any of the database creation tools. For example: SQLserver. The articles database includes information (attributes) related to the article. An example, of a first indicia value (or a part number for an article) is 00035B-005-01A. The adaptive aspect of the present invention is not limited to any particular part number, and the foregoing is simply being used as an illustration.

In step 302, a second indicia value is provided. The second indicia value may be different from the first indicia value and is associated with either a second article or to the same first article but differs from the first indicia value. An example of a second indicia value may be a part number 000358501A. Note, the part number in step 302 is slightly different from the part number in step 301.

The first indicia and second indicia values may include alphabetic characters, numeric characters, pad characters and separator characters. The pad characters include leading zeroes, leading spaces and trailing spaces. The separator characters include commas, periods, parenthesis, hyphens, forward slash, backward slash, colons, semi-colons, straight lines/slash, underscores, and the like.

Figure 4:
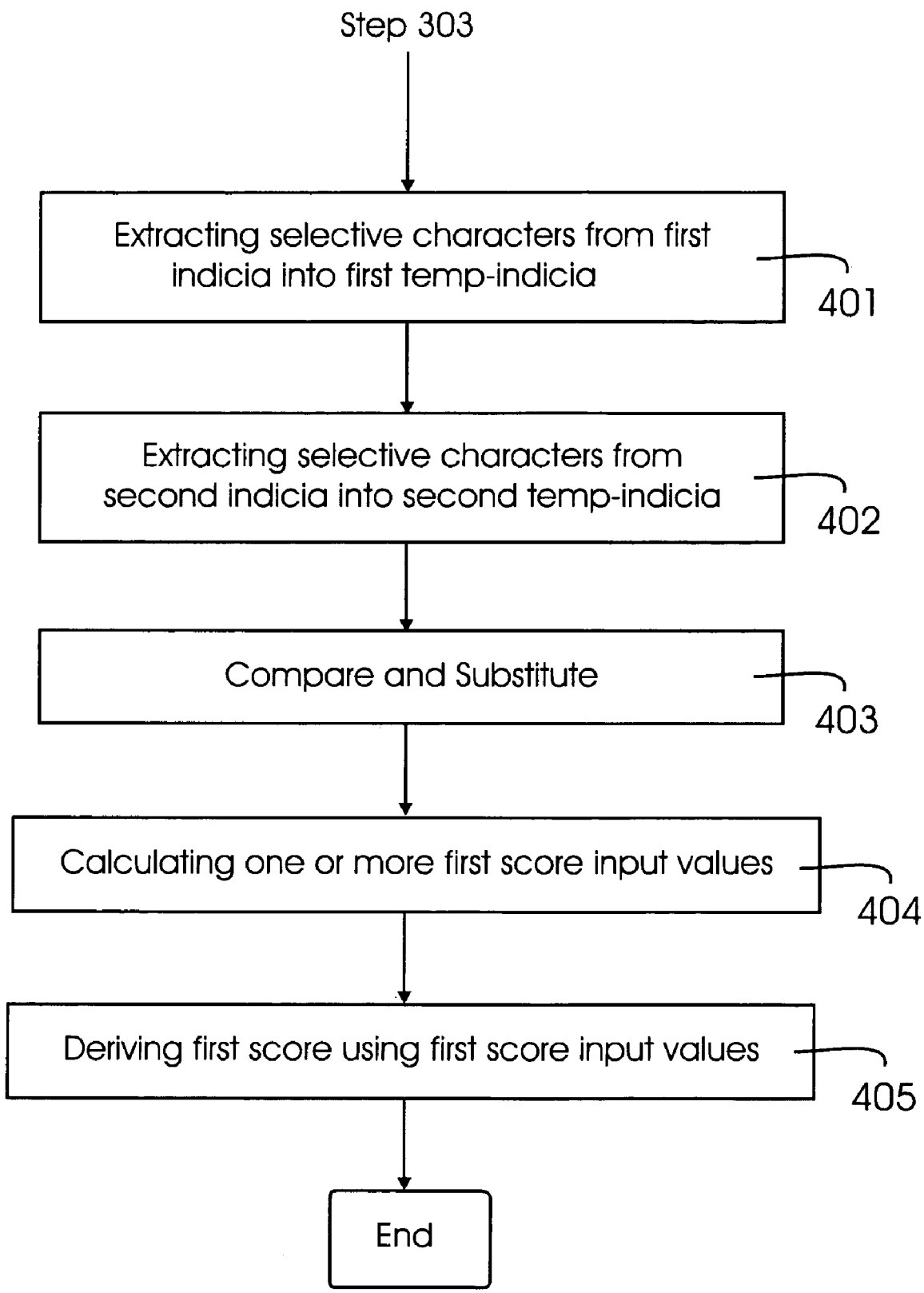
FIG. 4 shows a process flow diagram of the steps involved in obtaining the first score for the algorithm.

In step 303, the first and second indicia values are manipulated to obtain a quantifiable score. Step 303 is now described with respect to FIG. 4.

In step 401, certain characters are selectively extracted from the first indicia into first temporary indicia (temp-indicia) value. Step 402 of FIG. 4 refers to extracting selective characters in the second indicia into second temp-indicia. Extracting the selective characters could be, for example, to extract only the alphabetic characters and numeric characters leaving out the pad characters and separator characters from the original first indicia and second indicia. For example: If the first indicia were "003,873,768.0A ", the selective characters that get extracted into the first temp-indicia would be 38737680A. Continuing with the example from FIG. 3, the first temp-indicia value is 35B005O01A and 35801A (based on the first and second indicia values in step 301 and 302, respectively.

In step 403, the first temp-indicia and second temp-indicia are compared character by character. When a difference is found in the characters occurring in the same position in both the indicia, selective characters of the first temp-indicia are substituted with characters from a pre-configured table ((that is accessible to the computing system) or the selective characters of the second temp-indicia are substituted with the characters from the pre-configured table generating the modified first temp-indicia or the modified second temp-indicia. The characters that are substituted are a select group of characters that are considered to be susceptible for transcription errors. The pre-configured table consists of pairs of such characters. A sample of the character pairs that are in the pre-configured table are: B-8, l (lower case letter L)-1 (number one), b-6, S-5, O (letter O)-0 (number zero), I-1, Z-2. When the first temp-indicia or second temp-indicia has any one in the ordered pairs of characters, and difference is found when comparing the characters in first temp-indicia and second temp-indicia, the first temp-indicia character is substituted by the other in the ordered pair or the second temp-indicia character is substituted by the other in the order pair. For example: If the first indicia is 35B005O01A and the second temp-indicia is 358501A, the first indicia character B is substituted by the number 8 to generate the modified first temp-indicia—358005O01A.

Once the modified first temp-indicia or the modified second temp-indicia is generated, a first input score values are determined in step 404. Some of the first score input values that are calculated are length of longest common prefix, the length of longest modified temp-indicia and the length of longest common character string between the two temp-indicia. The longest length of the common prefix, in this embodiment, is limited to the first six characters. The common character string between any two-character strings is also called the Ngram. For example: if the modified first temp-indicia is 358005O01A and the second temp-indicia is 358501A then the first score input values is determined as follows: The length of the common prefix would be 3 (358), the length of the longest processed string in the two indicia would be 10

(358005O01A) and length of the longest common string between the two indicia is 3 or the longest NGram (358).

In step 405, the first score is determined using the first score input values. In one example, the first score value is determined by: longest NGram/(length of Longest String+0.1)+ length of common Prefix/10*(1−(longest NGram/(length of Longest processed String+0.1))). Based on the foregoing example, and substituting the first score input values, the first score value is=3/(10 +0.1)+3/10*(1−(3/10 +0.1) which when process is equal to 0.507920792079.

Referring back to step 304, the first and second indicia values are manipulated to determine a second score. Step 304 is described in detail with respect to FIG. 5.

Figure 5I:
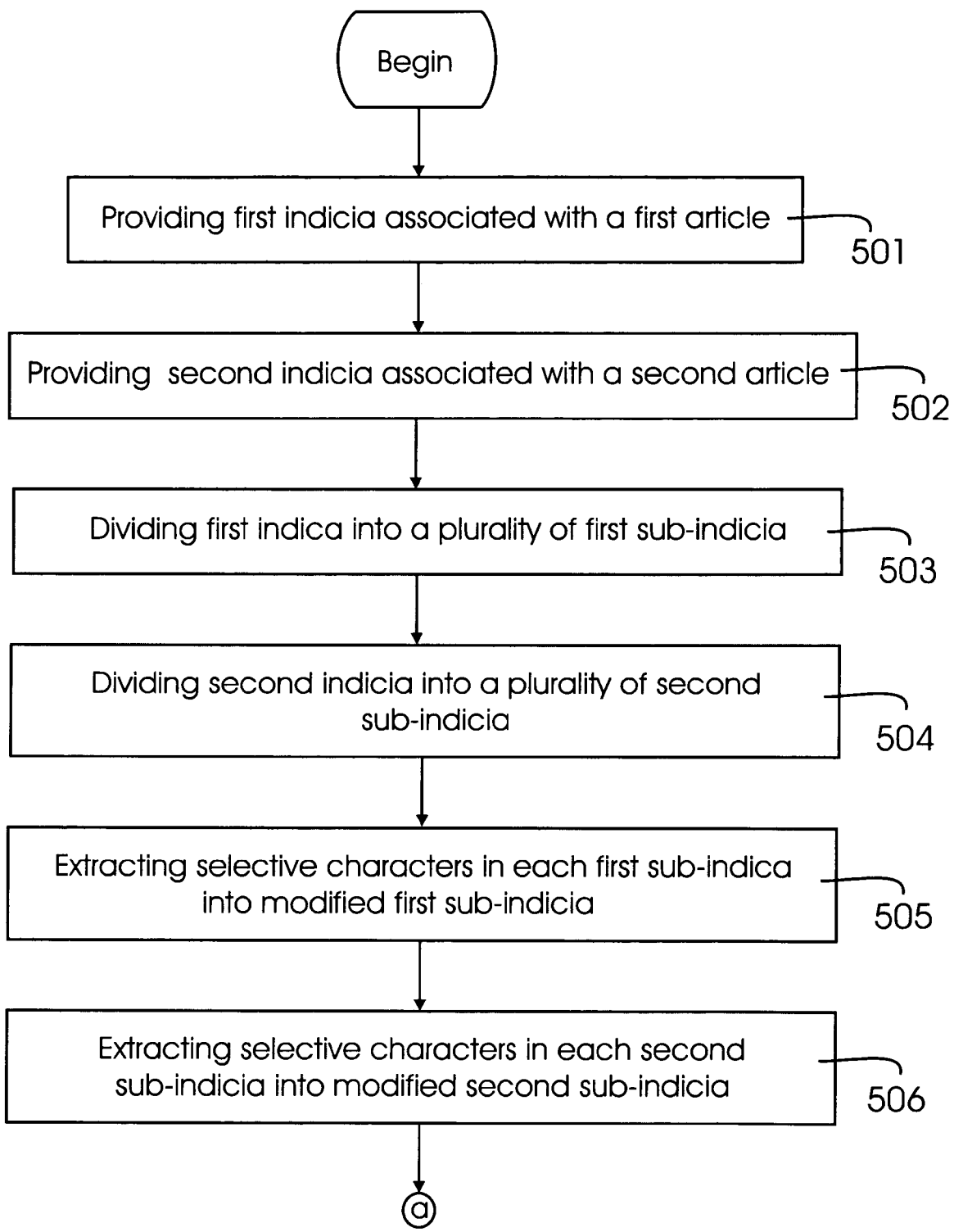
FIG. 5 shows a process flow diagram of the steps involved in obtaining the second score for the algorithm.
Figure 5:
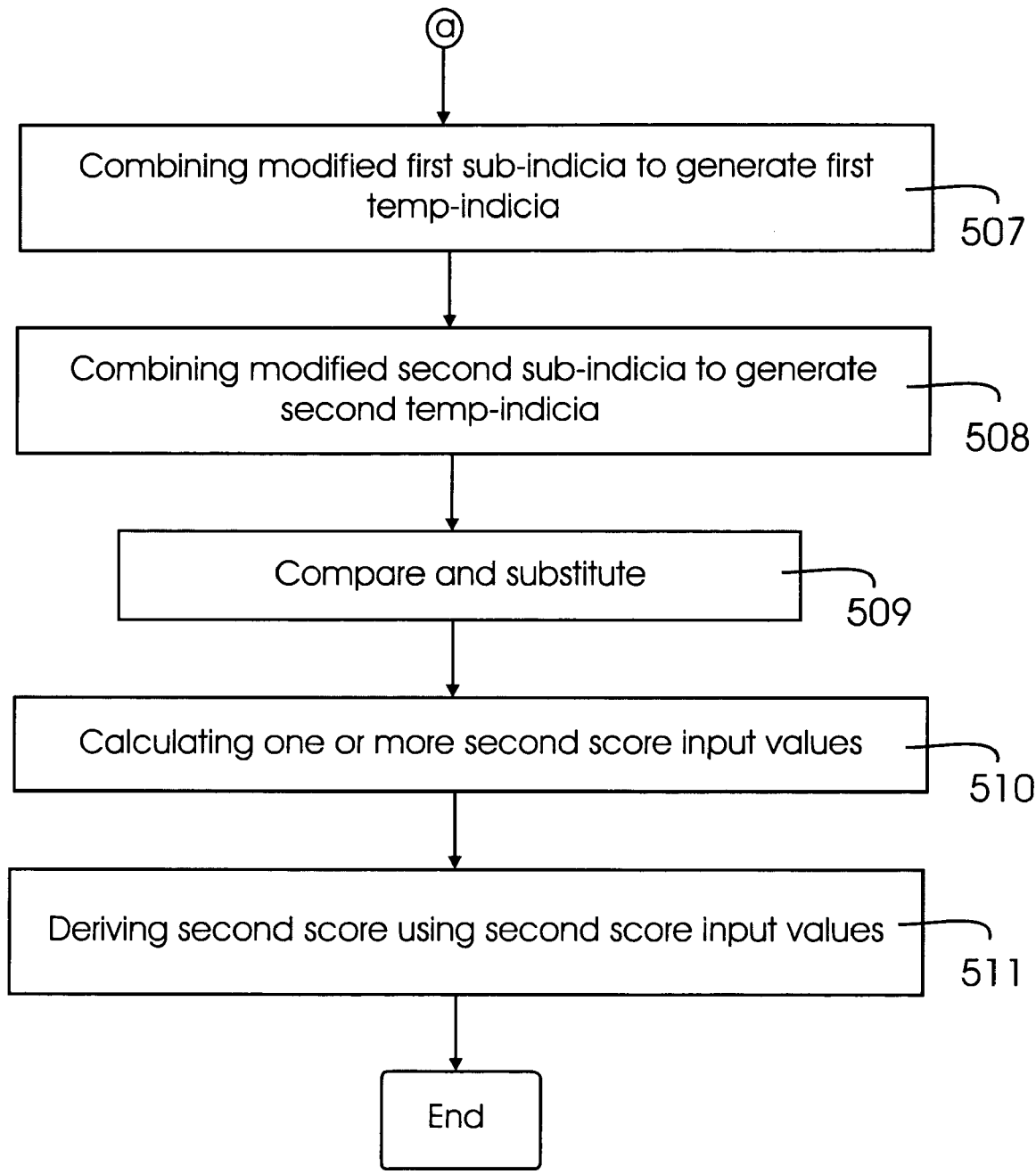

FIG. 5 refers to the manipulations steps involved in deriving the second score for the first indicia and second indicia. After the first indicia and second indicia are identified in the records for the two articles or for the same article in different formats as shown in 501 and 502 (which are similar to step 301 and 302 of Figure but have been shown in FIG. 5 for ease of illustration). The first indicia is parsed and sub-divided into a plurality of first sub-indicia in step 503. The process of dividing the indicia into sub-indicia is by examining each of the characters in the first indicia. Wherever the indicia have a separator character, the indicia are divided at that point into a sub-indicia. For example: The first indicia represented by a telephone number, for example, 506-097-1093 would be sub-divided into 3 first sub-indicia—506, 097 and 1093. Another example for first indicia would be: (506)-097-1093. In this example, the first indicia is parsed and sub-divided into the following first sub-indicia—506, 097, 1093.

Continuing with the foregoing example (where the first indicia is 00035B-005O-01A), for the first indicia, the following sub indicia values may be created in step 503: 00035B, 005O, 01A.

Step 504 represents the division step involving parsing the second indicia for separator characters and dividing the second indicia into a plurality of second sub-indicia wherever the separator characters are found in the second indicia. Step 504 results in the following second sub-indicia: 000358, 50, 1A.

In step of 505, each of the first sub-indicia is examined and selective characters are extracted into modified first sub-indicia. Various characters can be extracted, for example, the alphabetic characters and numeric characters may be extracted leaving out the leading zeroes in the sub-indicia fields. After the extraction, the following modified sub-indicia values are created: 35B, 5O, and 1A In step of 506, each of the sub-indicia for second indicia is examined and selective characters are extracted into modified second sub-indicia. Continuing with the foregoing example, the modified sub-indicia values are: 35B, 5O, 1A.

In step 507, the modified first sub-indicia are combined to generate the first temporary indicia (temp-indicia). For example, the first temp-indicia value after step 505 provides the following first temp-indicia value; 35B5O1A.

In step 508, the modified second sub-indicia are combined to generate the second temp-indicia, for example, 35B5O1A.

In step 509, the first temp-indicia and second temp-indicia are compared character by character. When a difference is found in the characters occurring in the same position in both the indicia, selective characters of the first temp-indicia are substituted with the characters from a pre-configured table generating the modified first temp-indicia or the selective characters of the second temp-indicia are substituted with the characters from the pre-configured table generating the modified second temp-indicia.

Once the modified first temp-indicia or the modified second temp-indicia are generated, the second score input values are calculated in step 510. In one aspect, the second score input values that are calculated are length of longest common prefix, the length of longest modified temp-indicia and the length of longest common character string (longest NGram). Continuing with the foregoing example, Longest Ngram-length=7, common prefix length=6, length of the longest character is 7.

In step 511, the second score value is determined using the second score input values. In one aspect, the second score is determined by: longest NGram/(length of Longest String+ 0.1)+length of common Prefix/10*(1−(longest NGram/ (length of Longest processed String+0.1)))longest Ngram/ (length of longest processed string+0.1)+length of common prefix/10*(1−(longest Ngram/length of longest common string+0.1).

Continuing with the foregoing example, the second score value is=7/(7+0.1)+6/10*(1−7/(7+0.1))=0.994366197183. The maximum of the first score and second score values derived from the manipulations steps 303 and 304 of FIG. 3 are used indicate the likelihood that the two indicia values refer to the same article. In this example, the second score value is used.

In step 305, the largest of the two score values is returned as relative likelihood that the first and second score refer to the same article (step 208).

In one aspect, the present invention provides a better way of understanding the unique characteristics of the structure of an indicia value associated with an article and the errors and variations that may occur during recording by plural sources. The process provides for more effective and efficient record matching or de-duplication of records than the existing string metrics. The process does not rely on any domain-specific knowledge of indicia and information about an article, so it can be used for any indicia.

While the present invention was described with respect to a particular embodiment, other embodiments, uses and advantages of the present invention will be apparent to those skilled in the art. The specifications and examples should be considered exemplary only. The intended scope of the invention is only limited by the claims appended hereto.

What is claimed is:

1. A method for determining a relationship between at least two indicia values that can be associated with at least a same article, comprising:
   providing a first indicia value associated with the article;
   providing a second indicia value associated with the article;
   manipulating the first indicia value and the second indicia value based on a first rule and obtaining a first score based upon the manipulated first indicia value and the manipulated second indicia value;
   manipulating the first indicia value and the second indicia value based on a second rule and obtaining a second score based upon the manipulated first indicia value and the manipulated second indicia value; and
   concluding that the first indicia value and the second value are associated with the same article based upon a threshold value for the first score and the second score.

2. The method of claim 1, wherein said first indicia value includes a sequence of characters, said sequence of characters made up of one or more alphabetic characters, numeric characters, separator characters and pad characters; and the second indicia includes a sequence of characters, said sequence of characters made up of one or more alphabetic characters, numeric characters, separator characters and pad characters.

3. The method of claim 2, wherein the pad characters include of leading blanks, trailing blanks and leading zeroes;

the separator characters include one or more from a group consisting of commas, periods, parenthesis, hyphens, forward slash, backward slash, colons, semi-colons, straight lines/slash, and underscores.

4. The method of claim 1,
wherein manipulating the first indicia value and the second indicia value based on a first rule further comprising:
extracting selective characters in first indicia value into a first temp-indicia value;
extracting selective characters in second indicia into a second temp-indicia value;
comparing one or more selective characters in the first temp-indicia value and/or second-temp indicia value;
substituting one or more selective characters from a pre-configured table for deriving a modified temp-indicia value; and
wherein obtaining a first score further comprising:
calculating one or more first score input values; and
deriving first score from first score input values.

5. The method of claim 4, wherein substituting for deriving a modified temp-indicia value comprising: substituting one or more selective characters in the first temp-indicia value with characters from the pre-configured table deriving first modified temp-indicia.

6. The method of claim 4, wherein substituting for deriving corresponding a modified temp-indicia value comprising: substituting one or more selective characters in the second temp-indicia value with characters from the pre-configured table for deriving a second modified temp-indicia value.

7. The method of claim 4, wherein alphabetic characters and numeric characters are extracted from the first indicia value into a first temp-indicia value and the second indicia value to a second temp-indicia value.

8. The method of claim 4, wherein the first score input values are based on a length of common prefix between the first temp-indicia value and the second temp-indicia value, a length of longest common character string between the first temp-indicia value and the second temp-indicia value, and a length of longest processed temp-indicia.

9. The method of claim 8, wherein the maximum length of common prefix is 6 character length.

10. The method of claim 1,
wherein manipulating the first indicia value and the second indicia value based on the second rule further comprising:
dividing the first indicia value into a plurality of first sub-indicia values,
dividing the second indicia value into a plurality of second sub-indicia values,
extracting selective characters in each of the first sub-indicia value into a modified first sub-indicia value;
extracting selective characters in each of the second sub-indicia values into a modified second sub-indicia value;
combining modified first sub-indicia value to generate a first temp-indicia value;
combining the modified second sub-indicia value to generate a second temp-indicia;
comparing one or more selective characters of the first temp-indicia value with the selective characters of the second temp-indicia value;
substituting one or more selective characters in the first temp indicia value and/or the second temp indicia value with characters from a pre-configured table for deriving a modified temp-indicia value; and wherein obtaining a second score further including:
calculating one or more second score input values; and
deriving the second score from the second score input values.

11. The method of claim 10, wherein dividing first indicia into a plurality of first sub-indicia further comprising:
parsing first indicia for non-alphanumeric characters; and
dividing the first indicia value into a plurality of first sub-indicia values at positions where non-alphanumeric characters are found.

12. The method of claim 10, wherein dividing the second indicia value into a plurality of second sub-indicia values, further comprising:
parsing the second indicia value for non-alphanumeric characters; and
dividing the second indicia value into a plurality of second sub-indicia values at positions where non-alphanumeric characters are found.

13. The method of claim 1, wherein and a maximum of the first score and the second scores indicates that relative likelihood that the first indicia value and the second indicia value refer to the same article.

14. The method of claim 1, wherein the first indicia value and the second indicia value are related to part numbers.

15. A system for determining a relationship between at least two indicia values that can be associated with at least a same article, comprising:
a processor configured to receive a first indicia value associated with the article;
receive a second indicia value associated with the article;
manipulate the first indicia value and the second indicia value based on first rule and obtain a first score based upon the manipulated first indicia value and the second indicia value;
manipulate the first indicia value and the second indicia value based on a second rule and obtain a second score based upon the manipulated first indicia value and the second indicia value; and
conclude that the first indicia value and the second value are associated with the same article based upon a threshold value for the first score and the second score.

16. The system of claim 15, wherein to manipulate the first indicia value and the second indicia value based on first rule, the processor extracts selective characters in first indicia value into a first temp-indicia value; extracts selective characters in second indicia into a second temp-indicia value; compares one or more selective characters in the first temp-indicia value and/or second-temp indicia value; substitutes one or more selective characters from a pre-configured table for deriving a modified temp-indicia value; and to obtain a first score, the processor calculates one or more first score input values; and derives a first score from the first score input values.

17. The system of claim 15, wherein to manipulate the first indicia value and the second indicia value based on the second rule to obtain the second score, the processor divides the first indicia value into a plurality of first sub-indicia values, divides the second indicia value into a plurality of second sub-indicia values, extracts selective characters in each of the first sub-indicia value into a modified first sub-indicia value; extracts selective characters in each of the second sub-indicia values into a modified second sub-indicia value; combines modified first sub-indicia value to generate a first temp-indicia value; combines the modified second sub-indicia value to generate a second temp-indicia; compares one or more selective characters of the first temp-indicia value with the selective characters of the second temp-indicia value; substitutes one or more selective characters in the first temp indicia value and/or the second temp indicia value with characters from a pre-configured table for deriving a modified temp-indicia value; and to obtain second score, the processor calculates one or more second score input values; and derives the second score from the second score input values.

18. The system of claim 15, wherein the processor concludes that the first indicia value and the second indicia value are associated with the article if one or both of the first score value and the second score value are above the threshold value.

19. The system of claim 15, wherein the first indicia value and the second indicia value are related to part numbers.

* * * * *